Oct. 11, 1966 S. E. SUMMERS ETAL Re. 26,102

RUPTURE DISC MOUNTING

Original Filed July 5, 1963 2 Sheets-Sheet 1

STANLEY E. SUMMERS
RUDOLPH VISKET
INVENTORS

BY Robert E. Rhoades

ATTORNEYS

RUPTURE DISC MOUNTING

Original Filed July 5, 1963 2 Sheets-Sheet 2

STANLEY E. SUMMERS
RUDOLPH VISKET
INVENTORS

BY

ATTORNEYS

United States Patent Office

Re. 26,102
Reissued Oct. 11, 1966

26,102
RUPTURE DISC MOUNTING

Stanley E. Summers, Woodland Hills, and Rudolf Visket, Anaheim, Calif., assignors to Calmec Manufacturing Corp., Los Angeles, Calif., a corporation of California Original No. 3,155,271, dated Nov. 3, 1964, Ser. No. 292,955, July 5, 1963. Application for reissue Oct. 6, 1965, Ser. No. 493,963
10 Claims. (Cl. 220—89)

Matter enclosed in heavy brackets [ ] appears in the original patent but forms no part of this reissue specification; matter printed in italics indicates the additions made by reissue.

This invention relates generally to pressure responsive devices and particularly to such devices as embody a rupturable diaphragm or disc, usually in conjunction with a relief valve.

Various constructions have been utilized embodying a diaphragm or disc which ruptures or bursts when the pressure in the system to which the disc is exposed exceeds a given value. However, those rupturable disc constructions with which we are familiar have several disadvantages, among which are the following: A lack of adjustability which requires precision manufacture and control of the disc itself; the variations in quality of the discs and their environment render the discs unsatisfactory where the working pressures in a system are close to the bursting pressure of the disc; a failure of the discs to rupture completely with the attendant disadvantages thereof; the unreliability of ruptured discs when used immediately upstream of a relatively small-volume closed space; and the inability of the discs to withstand repeated cycling in a system and to withstand undue vibration.

An object of the present invention is to provide a new and improved rupture disc construction or mounting which overcomes the above-noted and other disadvantages of rupture disc constructions heretofore devised.

Another object is to provide a novel rupture disc mounting or assembly which is adjustable within close tolerances for the particular components with which it is to be associated.

A further object is to provide a novel rupturable disc assembly which results in complete rupture of the disc when actuated. In this connection it is an object to provide a mounting embodying a member which functions to support an annular region of the disc and which rapidly snaps over center when the upstream pressure against the disc increases to the set point of the member.

More particularly it is an object to provide a novel mounting for a rupturable disc which embodies a preloaded conical spring washer supporting the disc and means for adjustably regulating the preloading of the washer.

A further object is to provide a device in which all parts employed are used at stress levels below their elastic limits thereby enabling pressure cycling in the system in which the device is associated up to 95% of the nominal rupture point of the disc.

These and other objects will be apparent from the drawings and the following description. Referring to the drawings.

Figure 1:
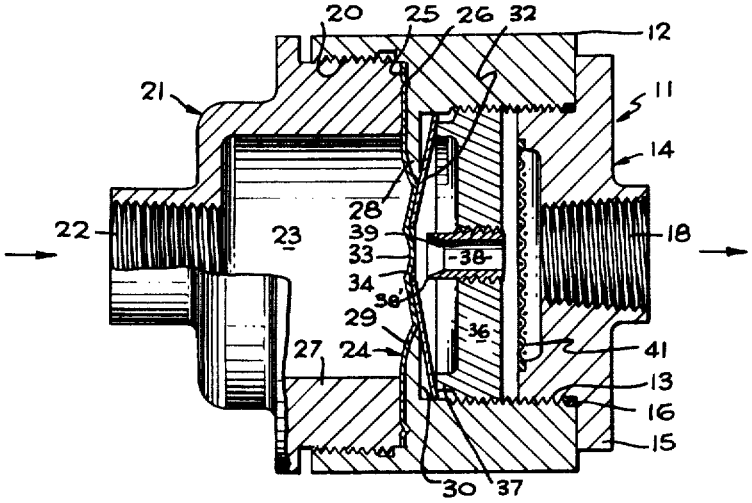
FIGURE 1 is a central longitudinal sectional view through a device embodying the invention.
Figure 2:
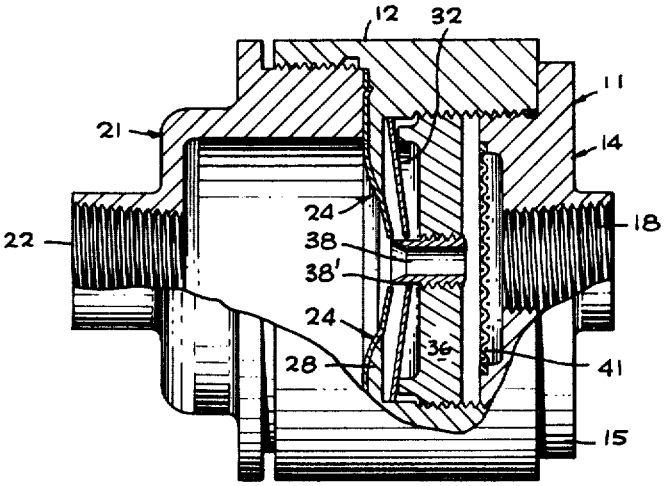
FIGURE 2 is a fragmentary sectional view similar to FIGURE 1 but showing the position of the parts after the disc has ruptured.

More particularly describing the invention, referring first to FIGURES 1 and 2, we show a device 11 which includes a main body 12 which is generally cylindrical. This is provided with a threaded bore 13 at its downstream end to receive an externally threaded cap 14. The latter has a flange 15 which limits its entrance into the member 12 and a seal ring 16 is shown provided between the parts. Member 14 is provided with an outlet opening 18 which is shown as threaded.

What will be termed the upstream end of the body 12 is provided with a threaded counterbore 20 in which is mounted a retainer 21. The latter has an inlet opening 22, shown as threaded, and a large space or chamber 23 therebeyond. The retainer is seated against the peripheral margin of a rupturable diaphragm or disc designated 24, often termed a rupture disc or a burst disc, and this may be made of aluminum or other desired material, the disc being seated on a shoulder 25 of the body. To insure proper mounting of the disc the parts 12 and 21 are provided with interfitting annular tongue and groove means 26 which firmly grips the disc.

Radially inward of the wall 27 of member 21 the disc is partially supported by an annular inner flange 28 which may be formed as a part of the body 12. The upstream side of this flange is shown as having a convexly arcuate surface 29 as seen in cross section. The downstream side or surface 30 of the flange may be flat and in a plane which is normal to the longitudinal axis of the device.

It is a particular feature of the invention that radially inward of the flange 28 for a limited distance the rupture disc is supported in part by a frusto-conical spring washer (such as a Belleville washer) designated 32. This leaves only a small but adequate-sized central circular section 33 of the disc unsupported within the region of the hole 34 centrally of the washer 32. The washer is backed up downstream by an adjustment nut 36 which is externally threaded so that it can be threaded into the bore 13 of the body. This nut is provided with an annular forwardly projecting wall 37 on its upstream side which bears against the peripheral region of the downstream side of washer 32. The washer in turn rests against the inner marginal edge of the disc-supporting flange 28 at about midway between its inner and outer edges so that the adjustment nut can be used to flex and preload the washer to a required degree. The center of the adjustment nut is fitted with a cylindrical punch 38 which is threaded into a hole 39. The punch has a sharpened upstream edge 38 which is smaller in diameter than the hole 34 in washer 32. A screen 41 is provided in member 14 to catch the severed section of the disc.

It will be apparent that the construction described utilizes a preloaded conical spring washer to back up and partially support a shearable or rupturable pressure-tight metallic diaphragm or disc. The conical washer preferably is predeflected by nut 36 to its negative rate position so that it acts somewhat like a trigger when upstream pressure is increased to its set point where snap-over occurs. When the washer snaps over center the sharp tubular punch shears the center unsupported portion 33 of the disc leaving a large diameter free-flow passage. The adjustment screw makes it possible to preset the desired load on the backup washer by predeflecting the washer past its peak force output thereby utilizing its negative rate for operation. It should also be apparent that the effective pressure-sensing area of the disc assembly is reduced or kept at a minimum by rigidly supporting the outside portion. This arrangement keeps the forces due to pressure relatively small in order to allow the use of a lightweight backup washer 32. The overall diameter of the washer is made relatively large in order to obtain maximum available travel during actuation, and this will be apparent from FIGURE 2 which shows the position thereof after actuation.

Figure 3:
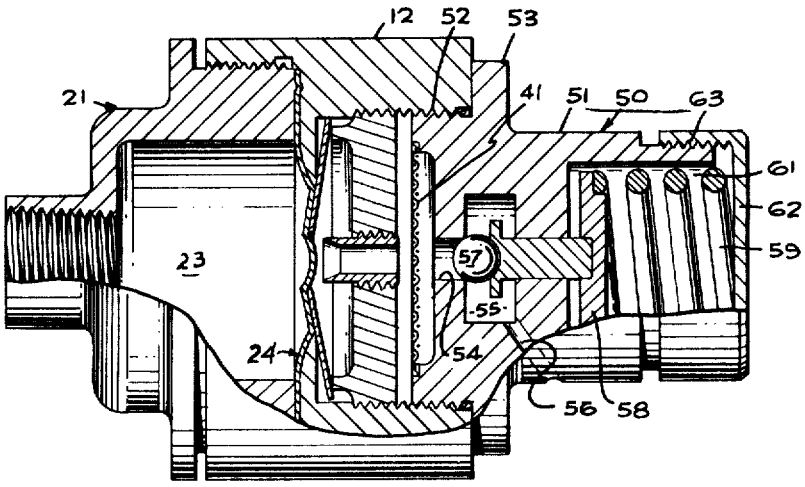
FIGURE 3 is a central longitudinal sectional view of the device of FIGURE 1 in conjunction with a relief valve.

In FIGURE 3 we show a typical installation wherein the cap 14 has been replaced by a relief valve designated generally by numeral 50. This includes a body 51 having a threaded end portion 52 which is received in body 12 and a limiting flange 53. The upstream end of the body is provided with a central opening 54 which opens into a valve chamber 55 having an outlet 56. A ball valve 57 seats against the wall forming the inner end of opening 54 and is yieldably urged to seated position by a retainer 58 and spring 59. The latter is housed in a cavity 61 provided in the end of body 51 and a cap 62 is provided to close the cavity, the latter being mounted on a reduced threaded end portion 63 of the body.

The construction shown in FIGURE 3 is illustrative of a condition where a chamber of small volume exists immediately downstream of the rupture disc and as previously pointed out the snap-over effect of the washer in conjunction with the punch assures complete rupture of the disc even where such small closed downstream chambers exist.

Figure 4:
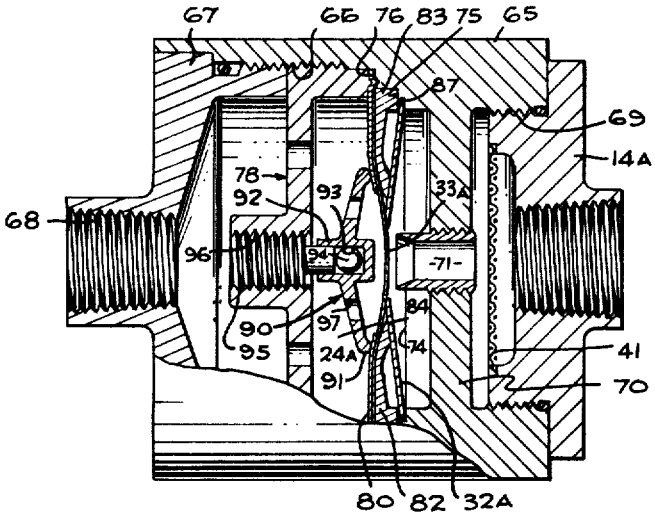
FIGURE 4 is a view similar to FIGURE 1 of a device embodying an alternate construction.

In FIGURE 4 we show an alternate construction or mounting for the rupture disc. In this form of the invention the adjustment is made upstream of the disc as will be apparent from the following description. In the figure, numeral 65 designates a cylindrical body and this is internally threaded at 66 to receive an inlet cap 67 having a reduced threaded inlet 68. The opposite end of the body may have a threaded bore 69 to receive a relief valve assembly (not shown) or merely a cap 14A as shown. A partition wall 70 of the body is provided with a tubular punch 71. The body has a series of stepped annular internal shoulders, designated individually 74, 75 and 76, respectively, the rupture disc, here designated by numeral 24A, being secured against shoulder 76 by a cylindrical retainer 78 which threads into bore 66. A backup washer 80 is provided on the upstream side of the disc.

The disc is partially supported over a large portion of its intermediate annular area by a deflectable annular support 82 which is seated against the shoulder 75, being provided with a thickened rim 83 in this region. The inner marginal portion of the support is tapered downstream somewhat and terminates in a relatively flat edge 84. Downstream of the support we provide the frusto-conical spring washer 32A. This seats against the shoulder 74 and is slightly less in diameter than the cylindrical face 87 adjacent the shoulder. The washer extends radially inward beyond the inner margin of the support 82 and thereby supports an annular region of the disc 24A leaving an unsupported central section 33A.

In this form of the invention the washer 32A is preloaded by an adjustable pad 90 which bears against the backup memebr 80. The pad has a rim 91 for this purpose and radially inward of this a hub 92 providing a socket 93 which receives a ball 94 that acts as a bearing for the inner end of a set screw 95. The latter is mounted in a threaded bore 96 in the retainer 78. The pad is apertured at 97 to establish open communication between the upstream side thereof and the disc.

It will be apparent that the spring washer 32A can be preloaded to a desired degree by adjustment of the screw 95 to function in the manner previously described with reference to the form of the invention in FIGURES 1–3.

Although we have shown and described preferred forms of our invention, we contemplate that various changes and modifications can be made therein without departing from the invention, the scope of which is indicated by the following claims.

We claim:

1. In a rupture disc device, a housing having an inlet and an outlet, means in the housing defining an orifice between the inlet and outlet, a rupture disc mounted in said housing upstream of the orifice and extending across the orifice to close the same, an annular frusto-conical spring washer in said housing downstream of the orifice and having an opening of less diameter than said orifice, the inner portion of said washer projecting into said orifice and supporting a limited annular area of the disc, said washer bearing against the inner edge portion of the orifice-defining means, and means for supporting said washer at its peripheral margin against movement downstream.

2. In a rupture disc device, a housing having an inlet and an outlet, means in the housing defining an orifice between the inlet and outlet, a rupture disc mounted in said housing upstream of the orifice and extending across the orifice to close the same, [an annular frusto-conical spring washer] *a resilient snap over member* in said housing downstream of the orifice [and having an opening of less diameter than said orifice, the inner portion of said washer projecting into said orifice and supporting a limited annular area of the disc, said washer bearing against the inner edge portion of the orifice defining means,] *said member having a first position bearing against the inner edge portion of said orifice and projecting into said orifice to support said disc in an annular region thereof and adapted to rapidly snap over center to a recessed position when the upstream pressure exceeds a set point,* means for supporting said [washer] *member* at its peripheral margin against movement downstream and adjustable means for deflecting said [washer] *member* toward snap over position whereby to preload the [washer] *member, punch means supported in said housing downstream of said orifice and positioned in axial proximity to said orifice so as to engage and to rupture said disc when said member snaps over center.*

3. The device set forth in claim 2 in which said adjustable means for deflecting the [washer] *member* is located downstream of said [washer] *member.*

4. The device set forth in claim 2 in which said adjustable means for deflecting said [washer] *member* is located upstream of said disc.

5. The device set forth in claim 2 in which said adjustable means comprises a member threadedly mounted in the housing downstream of the [washer] *member* for limited movement axially of said orifice and engageable with the peripheral margin of the [washer] *member.*

6. In a rupture disc device, a tubular housing having an inlet and an outlet, an annular support mounted at its periphery in said housing between said inlet and said outlet and defining an orifice, said support being stiffly resiliently deflectable, a rupture disc mounted in said housing immediately upstream of said support and secured at its peripheral margin, said disc extending across said orifice to close the same, a frusto-conical spring washer supported at its periphery in said housing immediately downstream of said support, said washer having an opening of less diameter than the opening through said support, and means mounted in said housing upstream of said disc and adjustable axially of the housing for deflecting said support downstream thereby to deflect and preload said washer toward snap over position, *and punch means supported in said housing downstream of said orifice positioned in axial proximity to said orifice so as to engage and to rupture said rupture disc when said washer snaps over center.*

7. The device set forth in claim 6 in which the means for deflecting said support comprises a backup washer immediately upstream of said disc, a perforate pad bearing against the inner marginal area of the backup washer, and screw means mounted in the housing for adjusting said pad axially of the orifice.

8. In a rupture disc device, a tubular housing body, having an inlet at one end and an outlet at the other and having an internal annular flange therebetween defining an orifice, a rupture disc in said body immediately upstream of said orifice, a retainer threadedly mounted in said body and securing the peripheral margin of said disc, a frusto-conical spring washer in said body downstream of said orifice, said washer having a smaller opening than said orifice, and an adjustment nut threadedly mounted in said body downstream of said washer for axial movement toward and away from the orifice, said nut bearing against the downstream side of the washer adjacent its periphery whereby to enable the nut to be used to flex and thereby preload the washer, *and punch means positioned on said nut in axial proximity to said orifice so as to engage and rupture said rupture disc when said washer snaps over center.*

*9. In a rupture disc device, a housing having an inlet and an outlet, means in the housing defining an orifice between the inlet and outlet, a rupture disc mounted in said housing upstream of the orifice and extending across the orifice to close the same, a resilient snap over member in said housing downstream of the orifice, said member having a first position bearing against the inner edge portion of the orifice-defining means to support said disc in an annular region thereof and adapted to rapidly snap over center to a recessed position when the upstream pressure exceeds a set point, means for supporting said washer at its peripheral margin against movement downstream and punch means supported in said housing downstream of said orifice and positioned in axial proximity to said orifice so as to engage and to rupture said disc when said member snaps over center.*

*10. In a rupture disc device, a housing having an inlet and an outlet, a rupture disc mounted in said housing*

*between said inlet and outlet and extending across said housing to close the same; tubular punch means axially mounted in said housing downstream of said disc; an annular frusto-conical spring washer in said housing downstream of said rupture disc, mounted in a first position supporting said rupture disc in an annular region thereof to retain said disc out of contact with said punch means and adapted to rapidly snap over center to a recessed position to release said disc into contact with said punch means.*

References Cited by the Examiner

The following references, cited by the Examiner, are of record in the patented file of this patent or the original patent.

UNITED STATES PATENTS

| | | | |
|---|---|---|---|
| 1,248,578 | 12/1917 | Vuilleumier | 137—69 |
| 2,225,220 | 12/1940 | Huff | 220—89 |
| 2,440,462 | 4/1948 | Cooper | 220—89 |
| 2,548,744 | 4/1951 | Simmons | 220—89 |
| 2,585,863 | 2/1952 | Smith | 137—525 |
| 2,977,020 | 3/1961 | Sawyer et al. | 220—89 |

LOUIS G. MANCENE, *Primary Examiner.*

RAPHAEL H. SCHWARTZ, THERON E. CONDON, *Examiners.*